Patented Sept. 20, 1932

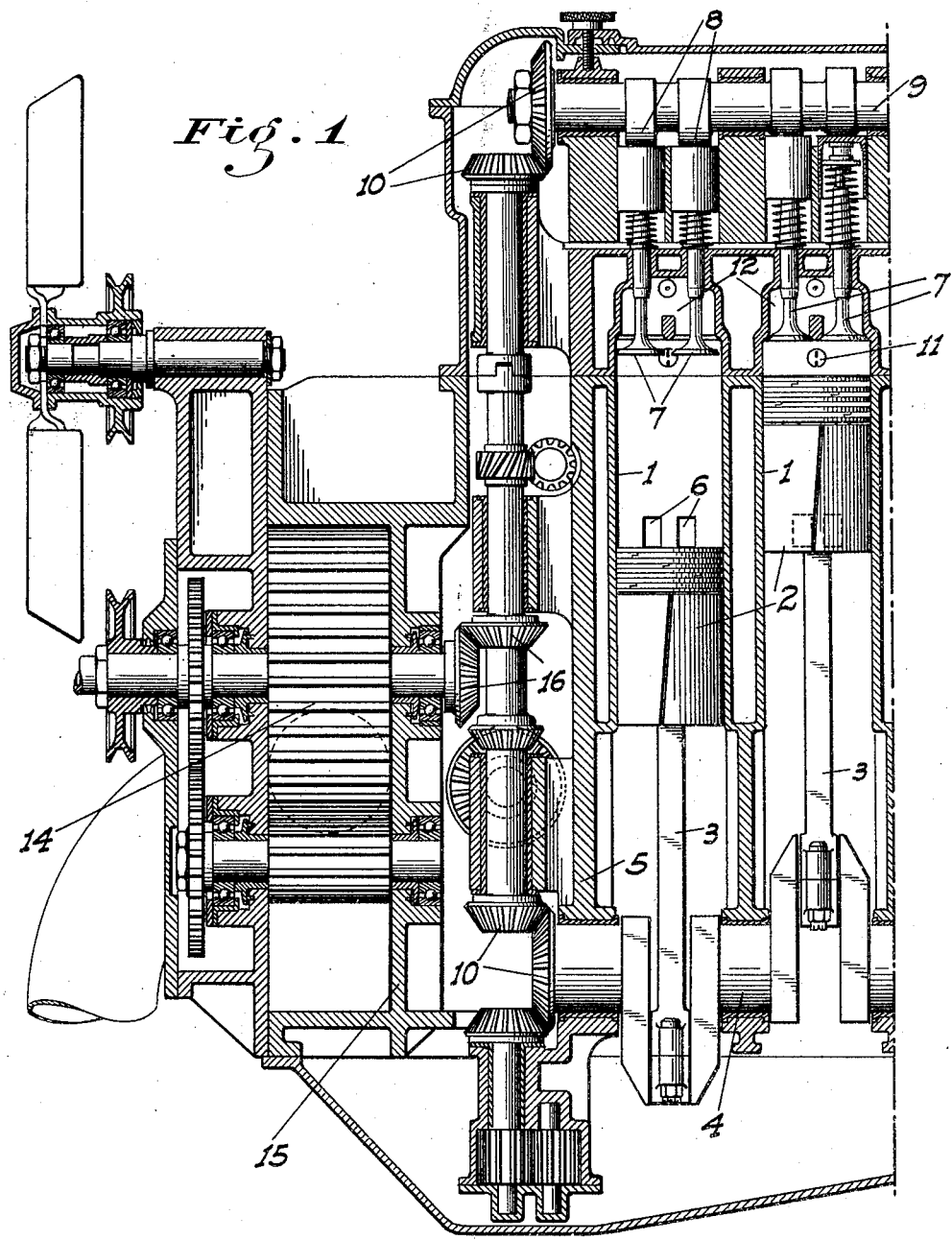

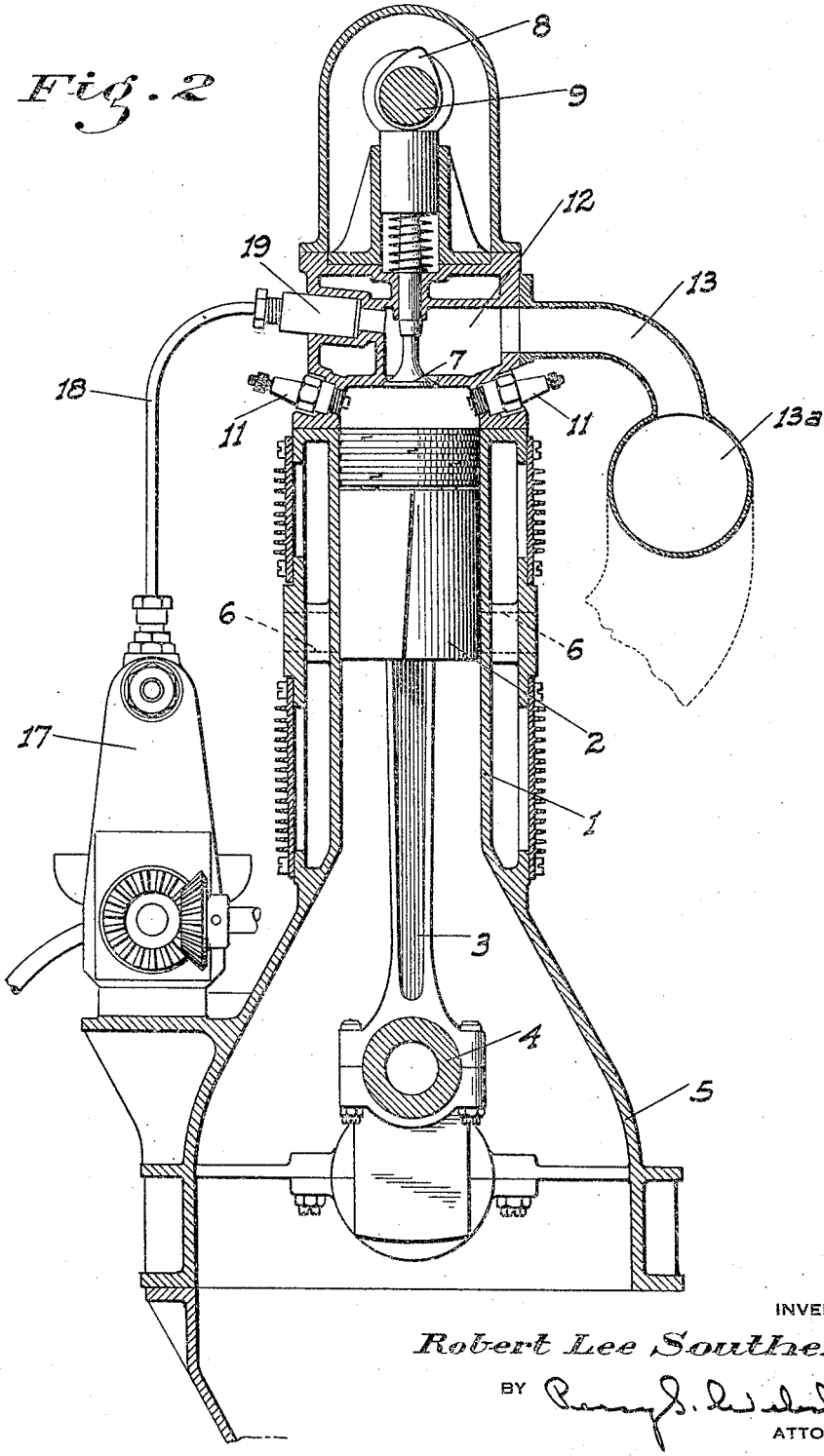

1,878,339

UNITED STATES PATENT OFFICE

ROBERT LEE SOUTHERN, OF PALO ALTO, CALIFORNIA, ASSIGNOR, BY MESNE ASSIGNMENTS, TO UNIVERSITY ENGINEERING COMPANY

TWO-STROKE CYCLE ENGINE

Application filed August 26, 1929. Serial No. 388,350.

This invention relates to gas engines of the two-stroke cycle type, my main object being to construct an engine of this fundamental character which will have the well organized advantages of that type as respects simplicity, considerably reduced weight per horse-power, steadiness of operation and throttling ability, and a relatively great possible power development as compared with engines of the usual four-stroke cycle type; without however the excessive fuel consumption usually considered unavoidable, and without using the crankcase of the engine as the source of compression for the fuel mixture and which is very inefficient, as is well recognized. At the same time the advantages of the four-stroke cycle engine as respects the thorough scavenging of the fired charge is incorporated in my engine—the lack of which in the ordinary two-stroke cycle engine cuts down the possible or theoretical power output considerably.

Essentially these ends are attained by directing a charge of fresh cool air at a certain fixed pressure from an ante-chamber into each cylinder as the corresponding exhaust port is opened and until said port again closes; and while this air is still being introduced into the cylinder but after the exhaust port is closed, forcing a premeasured amount of fuel also under very high pressure into the ante-chamber of the cylinder at such a point that an intimate mingling of the air and fuel immediately takes place before the mixture is delivered to the cylinder.

The compression of this mixture by the movement of the piston the outer end of its stroke places the same in the proper condition to be immediately fired to give the power stroke to the piston.

As a result of this arrangement not only is the cylinder thoroughly scavenged with precompressed air after each firing stroke but the cylinder and its spark plugs are kept cool and clean and the fuel is mixed with pure fresh air only so that the full possible power development is assured and none of the power is lost by the fresh fuel mixture being contaminated by or mingling with the exhaust gases, as is the case with the ordinary two-stroke cycle type of engine.

My improved engine also eliminates the need of the exhaust valves, with their tendency to overheat and warp, rocker arms and similar mechanisms, carbureter, and other features tending to give trouble in the usual type of four-stroke cycle and other engines. The engine being very simple and having relatively few parts and being capable of being made very light is therefore admirably suited to aviation work.

These objects I accomplish by means of such structure and relative arrangement of parts as will fully appear by a perusal of the following specification and claims.

In the drawings similar characters of reference indicate corresponding parts in the several views:

Fig. 1 is a fragmentary sectional elevation of my improved engine.

Fig. 2 is a cross section taken through one of the cylinders of the engine.

Referring now more particularly to the characters of reference on the drawings, the engine comprises any desired number of cylinders 1 having pistons 2 slidable therein which are connected by rods 3 with the crankshaft 4 of the usual character, which is journaled in the base 5 of the engine. Exhaust ports 6 of suitable capacity communicate with each cylinder and are positioned to be uncovered by the piston only as the latter approaches its bottom stroke position as usual in engines of this fundamental character.

Inwardly opening poppet valves 7 (preferably two to each cylinder) are mounted in the head of the same and are actuated by cams 8 fixed on a horizontal cam shaft 9 extending along the top of the engine. The cam shaft is driven from the crankshaft at crankshaft speed by suitable driving and shaft connections as indicated at 10 and in such timed relation to the movement of the piston as to cause the valves to be opened just as the piston uncovers the exhaust port, but to be closed a short time after the piston has again covered the port, and the air is compressed therein to a pressure not exceeding that of the air chamber and manifold. One or more spark plugs 11 project into each cylinder and are arranged in opposed relation just below the valves so as to be in position to be directly affected by the sweep of air passing through said valves and into the cylinder when the valves are opened. Ignition is provided for at the proper time by a suitable ignition mechanism of a standard type, as is customary.

Above the valves of each cylinder and communicating with the ports controlled thereby is a preferably horizontal and transversely extending chamber 12. On one end this chamber is connected by a passage 13 with a manifold 13a extending the full length of the engine and which receives its air directly from a supercharger 14 of standard positive type and which takes its air from any convenient point where the air is relatively fresh and cool. The supercharger is mounted in a casing 15 removably secured to a convenient part of the engine and is driven from the crankshaft at a suitable speed by suitable gearing connections 16 with the cam shaft drive as shown, or in any other manner which may be found most suitable.

Also driven from the crankshaft by suitable connections is a pressure fuel pump 17 of suitable type, from which individual leads 18 extend to spray nozzles 19 projecting into the various chambers 12 at the ends thereof opposite to the connection of the air passages 13 therewith. This pump is constantly driven while the engine is in operation. The pump however is arranged to deliver the fuel under pressure to the various leads only intermittently, or much in the same way as an electrical distributor controls the time of firing of the various plugs of an ignition system. The working mechanism of the pump is of course connected to the crankshaft of the engine in such timed relation that the fuel will be delivered to the various chambers only at the exact period in the cycle of operations when it is wanted.

The above features of construction are the only ones having any direct bearing on my invention, the force feed lubricating mechanism, the exterior cooling mechanism, and other features having nothing to do with my invention as far as the functioning of the essential features thereof is concerned.

In operation each piston of course functions independently of the others and therefore only the operation of one piston and its cooperating parts will be described:

Commencing with the beginning of the firing stroke and assuming that a compressed mixture is in the cylinder the firing of the mixture by the plugs causes the piston to descend. With the consequent rotation of the crankshaft the supercharger is constantly driven at 1½ engine speed, this being so constructed that a constant supply of air under pressure is delivered to and maintained in the manifold 13a and chamber 12. Such air however is not delivered to the cylinder until the piston starts to uncover the exhaust port, when the valves 7 are simultaneously opened, permitting the air to rush into the cylinder. Since the valve remains open until after the exhaust port has been again closed the cylinder is thoroughly scavenged of the fired charge. Besides the cylinder being cooled by the excess of air (which is of great importance), any carbon is swept from the same, and the plugs being in the direct path of the inrushing air at its coolest point are cooled and cleaned also so that they do not tend to crack or to become fouled. I have found from experiments that this air should be admitted at an exact pressure of 20.2 pounds absolute, which pressure is necessary to properly scavenge the cylinder, as well as to give the best and most efficient working pressure of the fuel mixture. My experiments showed that a pressure even a fraction above said 20.2 tended to cause preignition, while with a lower pressure the scavenging was not as complete and more heat was retained in the cylinder, causing self-ignition; and less power was produced by the subsequently formed mixture.

When the exhaust ports are fully open the pressure in the cylinder adjacent the same is of course considerably less than said pressure of 20.2 pounds, and the valves are consequently allowed to remain open even after the ports have been again closed by the piston until the cylinder pressure regains said amount.

The operation of the valves is timed so that they then immediately close, preventing any possibilty of back pressure toward the supercharger developing. Between the time of closing of the exhaust port by the piston and the time of closing of the valves (which is a comparatively few degrees of arcuate movement of the crankshaft) the fuel pump functions to deliver raw fuel under a heavy pressure into the chamber 12; the operation of the pump being timed to make such delivery at the exact movement desired, as previously explained. Such fuel being delivered into the chamber in opposed relation to the air under pressure which is still entering the chamber, said fuel is at once intermingled with this turbulently flowing air and is carried therewith into the cylinder in a thoroughly mixed form. The feeding of the fuel by the pump ceases a very short time before the valves close to permit the air to force the mixture into the cylinder. After the valves are closed the continued upward movement of the piston compresses this mixture so that by the time the piston reaches the top of its stroke said mixture is ready to be fired by the plugs, whereupon the piston again descends on its firing stroke and the cycle of operations above described again takes place.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A two-stroke cycle gas engine including a cylinder, a piston reciprocable therein, an exhaust port from the cylinder normally covered by the piston but positioned to be uncovered by the piston as the same approaches the bottom of its stroke, means operated by the movement of the piston to inject scavenging air under pressure into the cylinder during the entire period of opening of the exhaust port, and also for a certain period after the exhaust port is closed, and means for injecting fuel into the cylinder only during said last named period of delivery of air into the cylinder.

2. A two-stroke cycle gas engine including a cylinder, a piston reciprocable therein, an exhaust port from the cylinder normally covered by the piston but positioned to be uncovered by the piston as the same approaches the bottom of its stroke, a chamber at the head end of the cylinder, a passage connected to one end of said chamber, means for constantly forcing air under a predetermined pressure into said chamber, a fuel intake member discharging into said chamber, valve means between the chamber and the top of the cylinder, means to operate the valve means by the movement of the piston to permit such air to enter the cylinder while the exhaust port is open and for a certain period after the same is again closed, and fuel pump means connected to said fuel intake member to deliver fuel under pressure into the chamber only while the air is entering the cylinder after the exhaust port is closed.

3. In a two cycle gas engine, a cylinder, a chamber at the head end of and communicating with the cylinder, an air intake passage leading to one end of the chamber, means to force air through said passage and into said chamber, a fuel intake passage leading to the opposite end of the chamber, and means to force fuel through said fuel passage and into the chamber while the air is still flowing into the same.

In testimony whereof I affix my signature.

ROBERT LEE SOUTHERN.